UNITED STATES PATENT OFFICE.

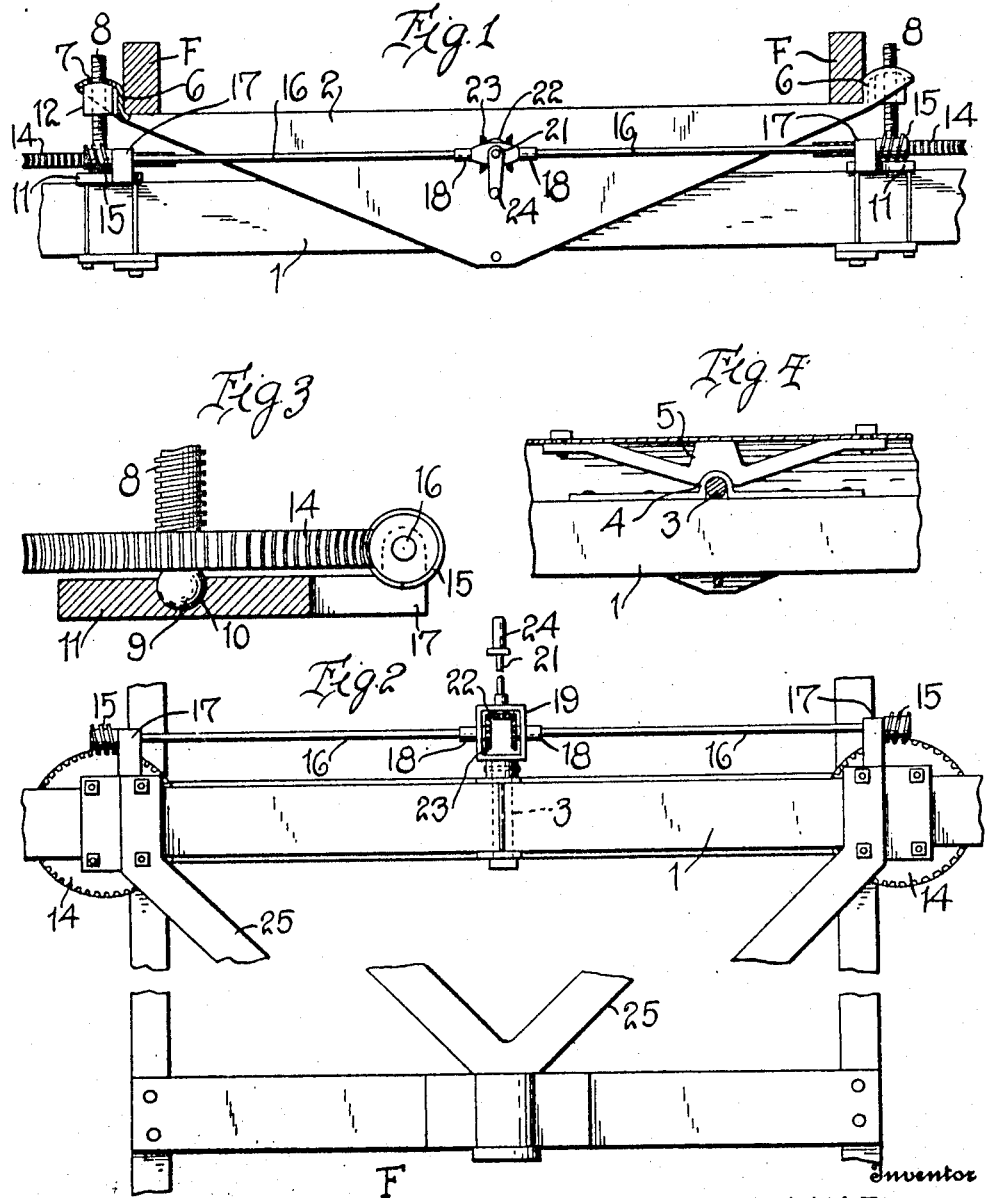

WILLIAM M. DEMING, OF ARTESIAN, SOUTH DAKOTA.

LEVELING-BOLSTER FOR VEHICLES.

1,176,817.

Specification of Letters Patent.   Patented Mar. 28, 1916.

Application filed June 11, 1915.  Serial No. 33,576.

*To all whom it may concern:*

Be it known that I, WILLIAM M. DEMING, a citizen of the United States, residing at Artesian, in the county of Sanborn and State of South Dakota, have invented certain new and useful Improvements in Leveling-Bolsters for Vehicles, of which the following is a specification, reference being had to the accompanying drawings.

This invention relates to certain improvements in leveling bolsters for vehicles and has relation more particularly to a device of this general character especially designed and adapted for use in connection with separators or other agricultural machines; and it is an object of my invention to provide a device of this general character having novel and improved means whereby the same may be operatively assembled with convenience and facility and whereby the same may be readily operated to meet the requirements of practice.

The invention consists in the details of construction and in the combination and arrangement of the several parts of my improved leveling bolster whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view, partly in elevation and partly in section, illustrating a leveling bolster constructed in accordance with an embodiment of my invention; Fig. 2 is a fragmentary view in bottom plan illustrating my invention as herein embodied; Fig. 3 is an enlarged detail fragmentary view, partly in elevation and partly in section, illustrating the operating means as herein set forth for the threaded shank or jack screw; and Fig. 4 is a fragmentary view, partly in elevation and partly in section, illustrating the pivotal connection between the bolster and its coacting axle.

As disclosed in the accompanying drawings, 1 denotes a rear supporting axle for supporting the rear end of a separator frame or the like through the medium of the leveling bolster 2 which is centrally pivoted to the axle 1 and, as herein embodied, said bolster is of channel formation with the flanges thereof overlying the axle 1 and having disposed therethrough the pin 3 also directed through the bearing 4 secured to the upper face of the axle 1. The bearing 4 is also engaged by the socket member 5 depending from the intermediate portion of the bolster whereby it will be readily perceived that an effective mounting for the bolster is afforded. The opposite extremities of the bolster are provided with the extensions 6 substantially in the form of an inverted L, with the feet thereof directed outwardly and longitudinally of the bolster and provided with the openings 7 through which are disposed the threaded shanks or jack screws 8.

The lower extremity of each of the shanks 8 is provided with a spherical head 9 adapted to be seated within the socket 10 produced in the plate 11 suitably affixed to the axle 1 whereby it will be readily perceived that said threaded shank is capable of universal movement so as to readily compensate for the vibrations incident to travel or from any other cause. Threaded upon the shank 8 is the block 12 on which the foot of an extension 6 is adapted to rest, the engaging face of the block being rounded so as to permit the same to move with the shank 8 without interfering with its coaction with the extension, as is believed to be self-evident.

The lower extremity of the shank 8 is provided with the gear 14 in mesh with the worm 15 affixed to the shaft 16 operatively supported by the bearing 17 carried by the plate 11 and having its inner extremity supported in the bearing 18 carried by the frame 19, herein disclosed as suitably affixed to a projected extremity of the pin 3. The frame 19, as herein embodied, is substantially rectangular in form and through its forward or outer bar is disposed the operating shaft 21, the inner extremity of which being provided with a gear 22 in mesh with a gear 23 carried by the inner extremity of the shaft 16. It is believed to be self-evident that upon axial rotation being imparted to the shaft 21, the block 12 will be caused to rise or lower and it will also be readily perceived that in the completed device, the blocks 12 move in unison but in opposite directions, for a purpose which is believed to be self-evident. While any means may be employed for imparting requisite rotation to the shaft 21, I herein disclose the outer extremity thereof as having affixed thereto a conventional hand crank 24.

In practice, it is of advantage to provide means whereby the axle 1 may be rigidly supported and, as disclosed in the accompanying drawings, I secure to the end portions of the axle 1 the extremities of the stirrup 25, herein disclosed as substantially V-shape in form, having its apex suitably engaged with the frame F of the vehicle.

From the foregoing description, it is thought to be obvious that a leveling bolster for a vehicle constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the scope of the appended claim and for this reason I do not wish to be understood as limiting myself to the precise arrangement and formation of the several parts herein shown in carrying out my invention in practice.

I claim:

In combination with an axle, a bolster mounted thereon for rocking movement in a vertical plane, the opposite ends of said bolster being provided with extensions, each of said extensions being substantially in the form of an inverted L with the foot thereof directed outwardly and longitudinally of the bolster, said foot having an opening therethrough, jack screws supported by the axle for universal movement and extending through the openings of the extensions of the bolster, blocks threaded upon the jack screws and on which the extensions of the bolster rest, the surfaces of the blocks with which the extensions contact being rounded, a shaft operatively engaged with each of the jack screws and disposed inwardly of the bolster, a frame operatively supported by the bolster and affording mountings for the inner extremities of the shafts, and an operating member carried by the frame operatively engaged with the inner extremities of the shafts for imparting axial rotation thereto, in reverse directions and in unison.

In testimony whereof I hereunto affix my signature in the presence of two witnesses.

WILLIAM M. DEMING.

Witnesses:
A. N. JOHNSON,
H. S. STEAUP.

Copies of this patent may be obtained for five cents each, by addressing the "Commissioner of Patents, Washington, D. C."